No. 786,284. PATENTED APR. 4, 1905.
F. G. GREEN.
PLANTING MACHINE.
APPLICATION FILED DEC. 29, 1904.
3 SHEETS—SHEET 3.
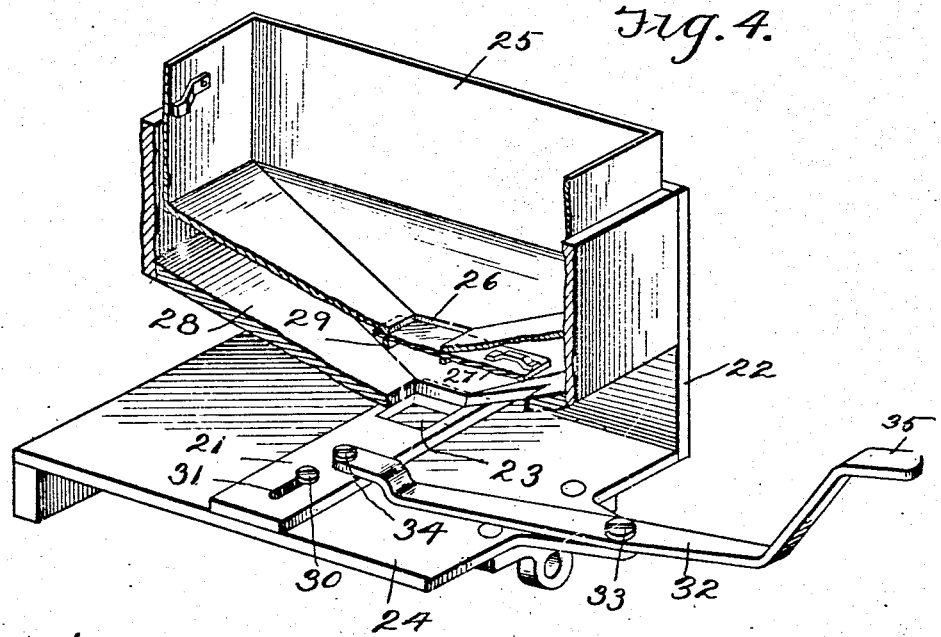
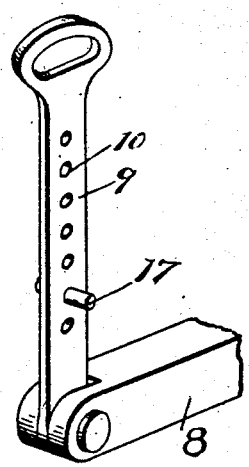
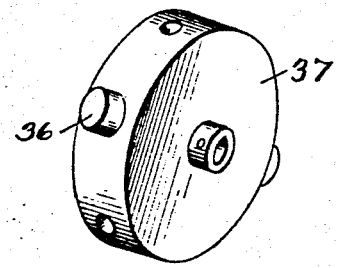

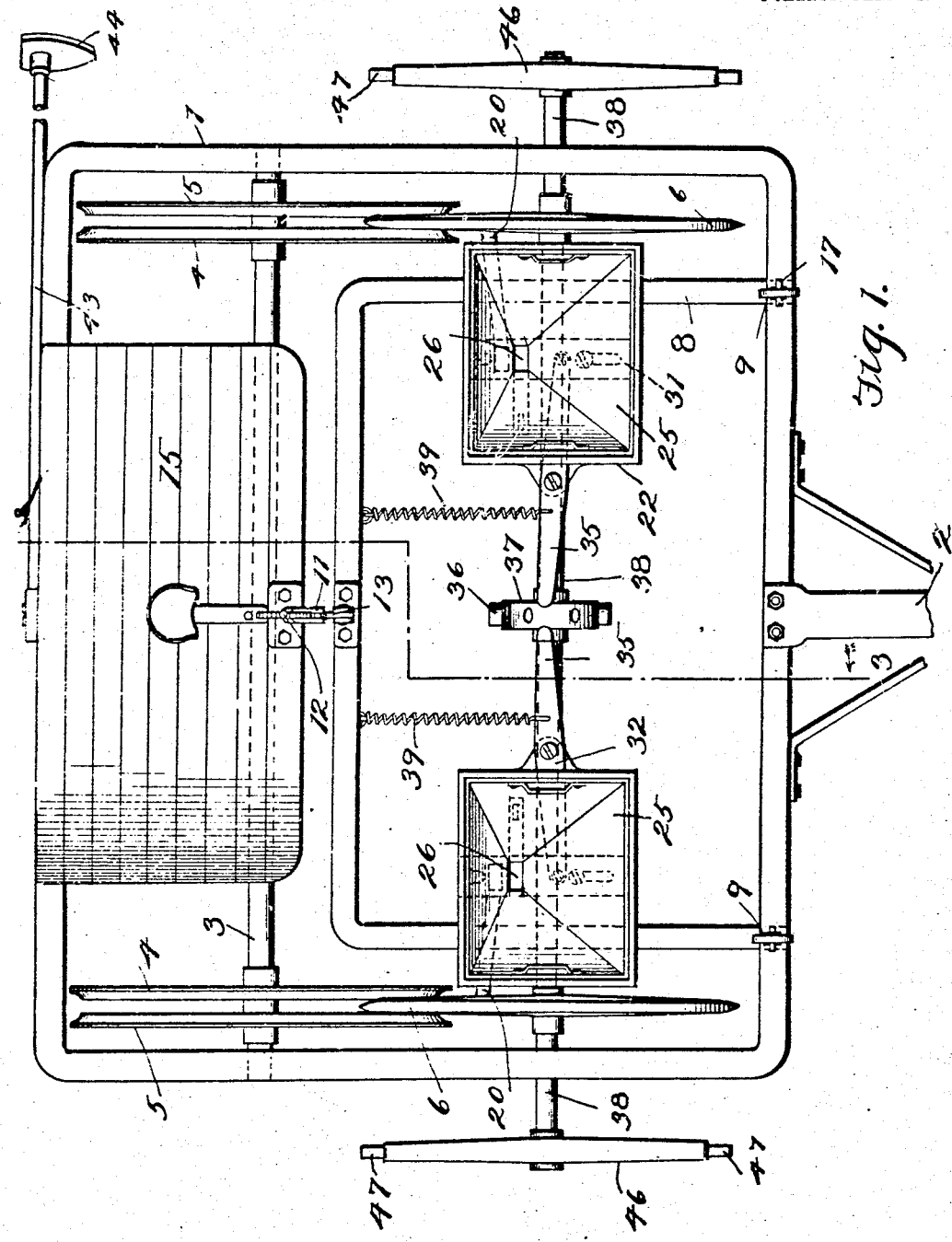

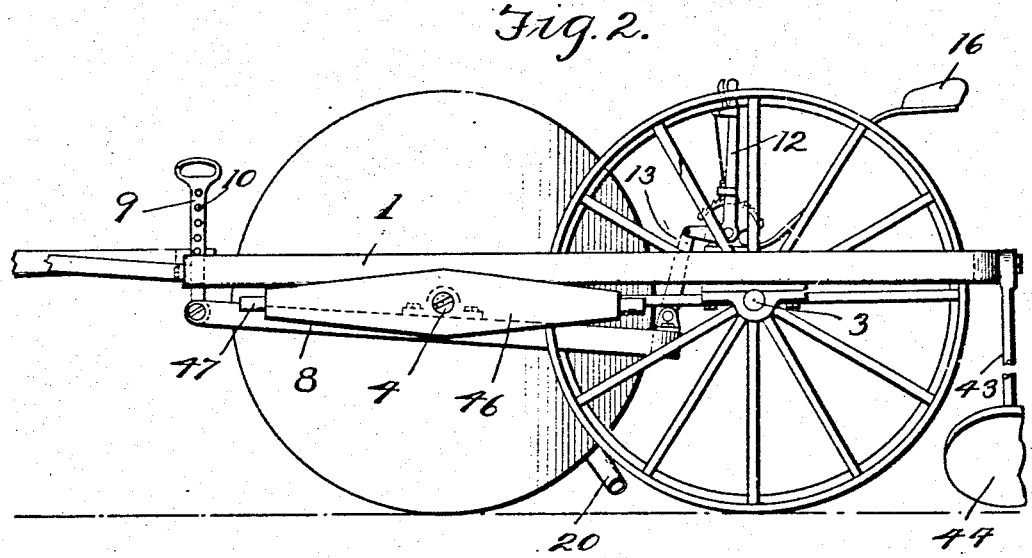
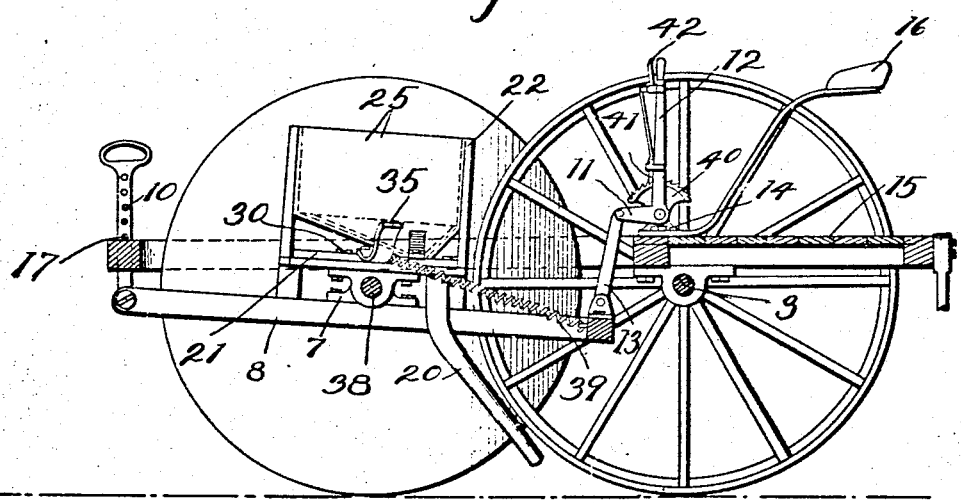

No. 786,284.

Patented April 4, 1905.

UNITED STATES PATENT OFFICE.

FELIX G. GREEN, OF SEDALIA, MISSOURI.

PLANTING-MACHINE.

SPECIFICATION forming part of Letters Patent No. 786,284, dated April 4, 1905.

Application filed December 29, 1904. Serial No. 238,794.

*To all whom it may concern:*

Be it known that I, FELIX G. GREEN, a citizen of the United States, residing at Sedalia, in the county of Pettis and State of Missouri, have invented certain new and useful Improvements in Planting-Machines; and I do hereby declare the following to be a full, clear, and exact description of the invention, such as will enable others skilled in the art to which it appertains to make and use the same.

My invention relates to planting-machines; and it consists of certain novel features of construction and combination of parts, the preferred form whereof will be hereinafter clearly set forth, and pointed out in the claim.

The main object of my invention is to provide a machine whereby rows of grain, as corn, &c., may be planted in such a way that the growing plants may be cultivated in rows extending longitudinally and transversely through the field, or, in other words, the plants will be disposed in hills and the rows will be straight both ways.

A further object, among others, is to provide a planter which will plant the corn, cane, or other grain either in hills or in continuous rows a proper distance apart and that the rows will be very straight and a uniform distance apart.

Other objects and advantages will be hereinafter made clearly apparent, reference being had to the accompanying drawings, which are considered a part of this application, and in which—

Figure 1 shows a top plan view of my invention complete. Fig. 2 is a side elevation thereof. Fig. 3 is a sectional view of Fig. 1 as indicated by dotted lines 3 3 of said view. Fig. 4 is a detail view in perspective, showing the hopper and planting mechanism. Fig. 5 is a perspective view showing means of adjusting the cutting or furrow-making disks. Fig. 6 is a perspective view showing the wheel employed to actuate the dropping-slides in the hopper.

For convenience of description the various parts of my invention and elements designed to coöperate therewith will be designated by numerals, the same numeral applying to a similar part throughout the several views.

Referring to the numerals on the drawings, 1 indicates the framework of my machine, which may be made of any suitable material, while 2 indicates the tongue to which the draft-animals are attached in the usual manner. Upon the framework thus or otherwise constructed I provide a journal or axle 3, and upon said journal I secure the carrying-wheels, consisting in this instance of a pair of separated wheels proper, 4 and 5, such separation being of sufficient extent to receive between them the contiguous edge of the cutting or furrow-making disks 6, which should be substantially of the same size as the carrying-wheel. It will be observed that the tread-surface of the sections 4 and 5 when assembled is concave, thus providing a means for filling the furrow after the grain is dropped therein.

The object in placing the disk-wheels between the carrying-wheels 4 and 5 is to insure that the said disks will scour and will therefore be in better condition to cut cleanly through the soil, clods, cornstalks, and the like located in the path of the disks.

The disk-wheels are mounted in bearings 7 upon the auxiliary frame 8, the forward ends of the auxiliary frame being pivotally connected to the standards 9, each of said standards being provided with a plurality of perforations 10 and extended loosely upward through apertures in the front portion of the framework 1, as clearly shown in Figs. 1, 2, and 3. The rear portion of the auxiliary frame 8 is connected to the crank-arm 11 of the controlling-lever 12 and by means of the link-section 13, as illustrated in Fig. 3, the said controlling-lever 12 being pivoted upon a bracket 14, placed upon the platform 15, near the seat 16, whereby the operator may grasp said lever, and thus raise the rear end of the auxiliary frame or lower the same, as desired, while the forward end of the auxiliary frame may be raised or lowered by placing the pin 17 through one of the apertures 10 in the member 9.

Instead of using the well-known form of runner and shoe for making the furrow I employ the disks 6, which are designed to open a furrow of sufficient depth and width to receive the grain delivered through the grain-conveying chute or tube 20, said tube leading from the planter-plate 21.

It will be observed that I have provided an exterior casing or hopper-section 22 of proper size, and the planter-plate 21 is therefore provided with an opening 23, which is designed to register with an opening in the platform or base 24, said opening in the base being in communication with the tube 20, as is obviously necessary. Within the exterior casing or hopper 22 I place the removable hopper-section proper, 25, which is provided with an opening 26 in the bottom portion thereof and with a slide 27, designed to close said opening when desired, said removable hopper being supported and held slightly away from the bottom 28 by the flanges or cleats 29. The bottom 28 is provided with an opening immediately over the opening 23 in the slide, and it is obvious that the opening 26 in the removable hopper is placed immediately above the opening 29, and it therefore follows that the grain will be directed downward through said openings into the opening 23 and thence delivered into the tubular conveyer 20 and thence into the furrow made by the disks 6.

The slide 21 is adapted to be reciprocated longitudinally, the same being held in place by a set-screw 30 at each end, located in a slot 31, as shown in Fig. 4, and in order that the slide 21 may be reliably actuated at the proper moment to deliver the grain so that it will be located a uniform distance apart I have provided the controlling-lever 32, pivoted to the base member by the set-screw 33 and also pivotally connected to the slide in any desired way, as by the screw or rivet 34. The controlling-lever 32 is bent upward at its inner end, as indicated by the numeral 35, and said terminal 35 is designed to be engaged by the pin or lug 36 upon the actuator 37, which latter is secured rigidly to the shaft 38, upon which the disks 6 are mounted, as before explained. The pins or lugs 36 upon the actuating-wheel 37 are so located that the slide 21 will be reciprocated or moved longitudinally each time the terminal 35 engages the same, thereby dropping the proper quantity of the grain through the conveyer-tube 20. When it is desired to increase the number of hills in a row, additional pins are secured to the actuator 37, additional holes for that purpose being provided in said actuator, as shown.

It will be understood that there are two hoppers and dropping-slides coöperating therewith and that the controlling-levers 32 are disposed with their terminals 35 directly in the pathway of the lugs 36 and also that said levers are held normally rearward by the springs 39, as clearly shown in Fig. 1. The lever 12, it will be observed, is held in an adjusted position by the rack-bar 40 coöperating with the detent 41, controlled by the thumb-lever 42, as is common. To the rear end of the main frame I pivotally secure the arm 43, having upon its outer end the marker or wheel 44, and inasmuch as said arm is pivoted directly in the center of the frame the outer free end thereof projects the same distance beyond the frame upon both sides thereof, and the marker 44 is designed to lay out the next row to be followed by the driver on the return trip, thereby enabling the driver to make the rows absolutely straight and a proper distance apart from the last rows planted.

The object in providing the inner hopper 25 is to enable it to be bodily lifted out of the exterior casing or hopper 22, so that access may be gained to the discharging-apertures and the plate 21 should the same be clogged or defective from any source, said hopper 25 being bodily removed with the grain therein, which can be accomplished when the opening 26 is closed by the slide 27 or equivalent means.

The shaft 38, upon which the disks 6 are mounted, is projected beyond the frame 1 and has secured to the outer ends thereof marking-arms 46, said arms having projections 47 at each end thereof, which are designed to take into the ground at each semirevolution of the disks. These arms are so arranged with respect to the pins 36 that the grain will be dropped in the furrow directly opposite and in line with the depression made in the earth by the projections 47. By this means the driver is enabled to keep the rows in a straight line in both directions, as when he reaches the end of the row the location of the last grain dropped is noted by the depression made by the projection 47, and before the next row is started the disks 6 are rotated until the projections 47 are in line with the depressions in the preceding rows, when the disks are lowered into position and the team started.

The various parts of my invention may be cheaply and expeditiously manufactured, and while I have described the preferred combination and construction of parts deemed necessary in carrying out my invention I desire to comprehend in this application all such substantial equivalents and substitutes as may be considered as falling fairly within the scope and purview of my invention.

What I claim as new, and desire to secure by Letters Patent, is—

The herein-described planter comprising a suitable framework and carrying-wheels therefor, said carrying-wheels being each formed in two parts, separated slightly from each other; furrow-making disks 6 adapted to have one portion of their edges disposed between the separated carrying-wheels whereby the disks will be kept clean and in a scoured condition; a pair of hoppers; grain-conveying tubes extending from said hoppers to the furrows made by said disks; a slide mounted in the bottom of each hopper and an actuating-disk controlling a lever connected with said slides whereby each of the slides will be operated simultaneously and at predetermined points to dispose the grain in continuous or drilled rows or in hills of uniform separation, all combined substantially as et forth.

In testimony whereof I have signed my name to this specification in the presence of two subscribing witnesses.

FELIX G. GREEN.

Witnesses:
GEO. WITTEMEYER,
W. E. CONNER.